United States Patent
Wei

(10) Patent No.: US 11,156,797 B2
(45) Date of Patent: Oct. 26, 2021

(54) LENS MODULE

(71) Applicant: AAC Technologies Pte. Ltd., Singapore (SG)

(72) Inventor: Chuandong Wei, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 221 days.

(21) Appl. No.: 16/529,764

(22) Filed: Aug. 1, 2019

(65) Prior Publication Data
US 2020/0049931 A1 Feb. 13, 2020

(30) Foreign Application Priority Data
Aug. 10, 2018 (CN) .......................... 201821295777.5

(51) Int. Cl.
*G02B 7/02* (2021.01)
(52) U.S. Cl.
CPC .................................. *G02B 7/025* (2013.01)
(58) Field of Classification Search
CPC .... G02B 7/025; G02B 7/022; G02B 27/0006; G02B 7/02; G02B 7/021; G02B 7/023; G02B 13/001; G02B 3/04; G02B 3/14; G02B 7/04; G02B 7/08; G02B 7/09; G02B 7/102; H04N 5/2254; H04N 5/2253; H04N 5/2257; H04N 5/2252; H04N 5/23287; H04N 5/23293; H04N 5/232933; B29C 65/14; B29C 65/1406; B29C 65/1435; B29C 65/1487; B29C 65/48; B29C 65/4845; B29C 66/5344; B29L 2011/0016

USPC ......................................................... 359/819
See application file for complete search history.

(56) References Cited

U.S. PATENT DOCUMENTS

| 7,311,453 | B2* | 12/2007 | Li | G02B 7/021 |
| | | | | 396/529 |
| 7,715,126 | B2* | 5/2010 | Apel | G02B 7/026 |
| | | | | 359/819 |
| 2004/0042088 | A1* | 3/2004 | Ito | G02B 7/022 |
| | | | | 359/819 |
| 2009/0079863 | A1* | 3/2009 | Aoki | H04N 5/2253 |
| | | | | 348/374 |
| 2010/0302656 | A1* | 12/2010 | Komi | G02B 7/02 |
| | | | | 359/819 |
| 2010/0321562 | A1* | 12/2010 | Chang | G02B 7/02 |
| | | | | 348/374 |
| 2011/0063739 | A1* | 3/2011 | Hirata | G02B 7/021 |
| | | | | 359/819 |
| 2017/0048432 | A1* | 2/2017 | Campbell | G02B 27/0006 |

(Continued)

*Primary Examiner* — Collin X Beatty
(74) *Attorney, Agent, or Firm* — W&G Law Group

(57) ABSTRACT

The present disclosure provides a lens module. The lens module includes a lens and a bearing seat matching connected to the lens; the lens includes a lens barrel, the lens barrel includes a first barrel provided with an optical aperture and a second barrel wall bending and extending from the first barrel wall; the bearing seat includes a surrounding wall around the second barrel wall; the lens is assembled on the bearing seat, the lens and the surrounding wall form an adhesive accommodating slot. The second barrel wall and the surrounding wall are bonded via the adhesive accommodating slot. Compared with related technologies, the lens module of the present disclosure occupies a smaller space, increases a screen-to-body ratio of an electronic product, and has low production difficulty.

7 Claims, 4 Drawing Sheets

(56) References Cited

U.S. PATENT DOCUMENTS

2018/0129011 A1\* 5/2018 Tsai ..................... H04N 5/2254
2018/0309913 A1\* 10/2018 An ........................ G02B 7/022
2018/0364441 A1\* 12/2018 Hubert ................ H04N 5/2254

\* cited by examiner

LENS MODULE

TECHNICAL FIELD

The present disclosure relates to the technical field of camera lenses, more particular to a lens module.

BACKGROUND

With a continuous development of technologies, electronic devices are constantly moving toward intelligence development. In addition to digital cameras, portable electronic devices, such as tablet computers and mobile phones, are also equipped with lens modules. In order to meet people's use needs, higher requirements are raised on image quality of object captured by using the lens modules.

A lens module in related technologies includes a lens barrel and a bearing seat used to accommodate the lens barrel. An external thread is disposed on an outer wall of the lens barrel, and an internal thread is disposed on an inner wall of the bearing seat. The lens barrel is fixedly connected through the external thread and the internal thread.

However, a lens module fixed through threads usually occupies a relatively large space, so as to reduce a screen-to-body ratio of an electronic product. In addition, it is relatively complex to manufacture threads and to dispose threads on lens modules with relatively small volumes. Therefore machining is more difficult due to relatively high machining precision is required.

Therefore, it is necessary to provide a novel lens module to resolve the foregoing disadvantages.

BRIEF DESCRIPTION OF THE DRAWINGS

To describe the technical solutions in the embodiments of the present disclosure more clearly, drawings required in description of the embodiments will be introduced simply in the following. It is obvious that the drawings in the following description are only some of the embodiments of the present disclosure, and a person of ordinary skill in the art may obtain other drawings based on the drawings without creative efforts. In the accompanying drawings.

DETAILED DESCRIPTION

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

Embodiment 1

Figure 1:
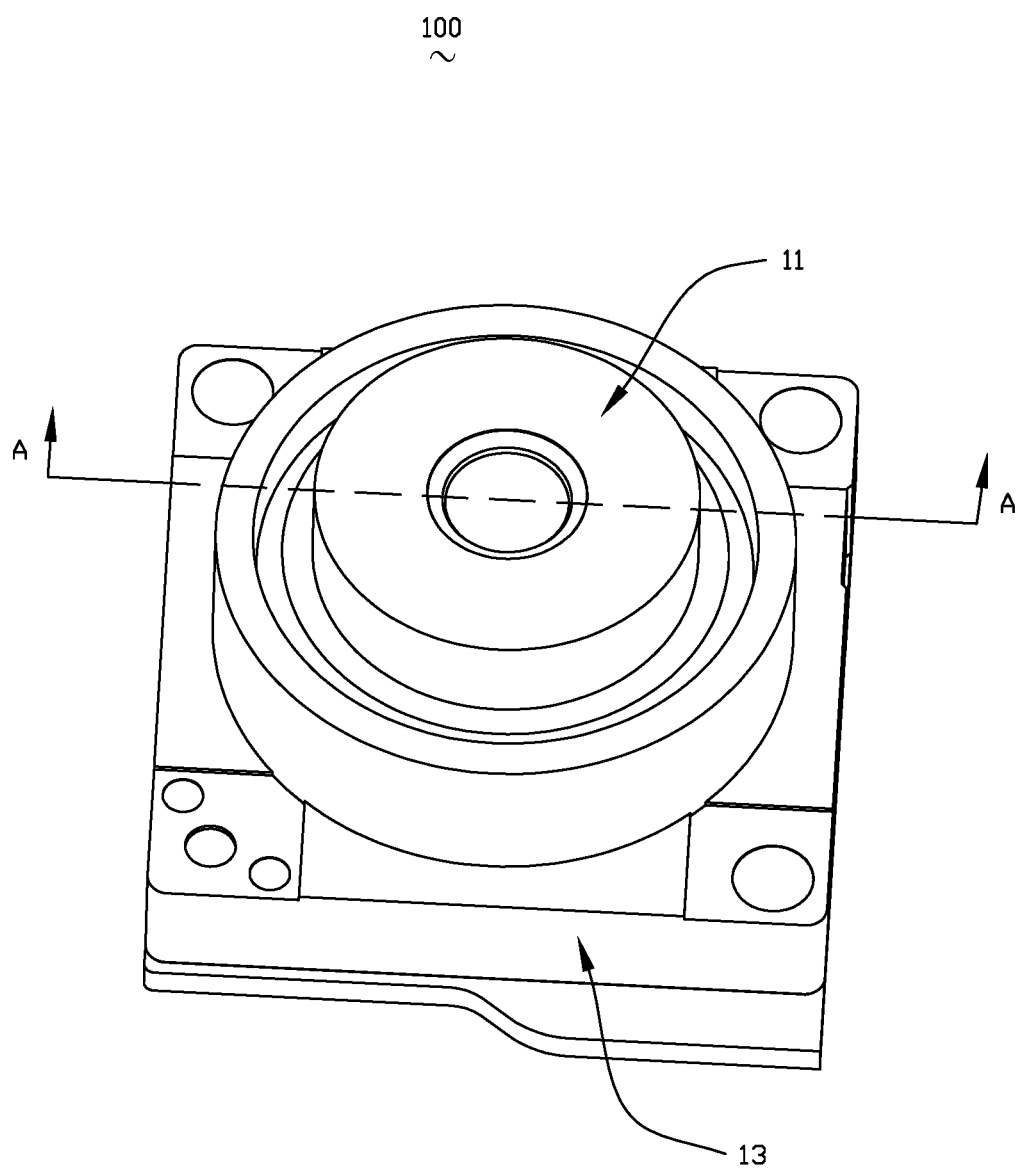
FIG. 1 is an overall structural view of Embodiment 1 of a lens module according to the present disclosure.
Figure 2:
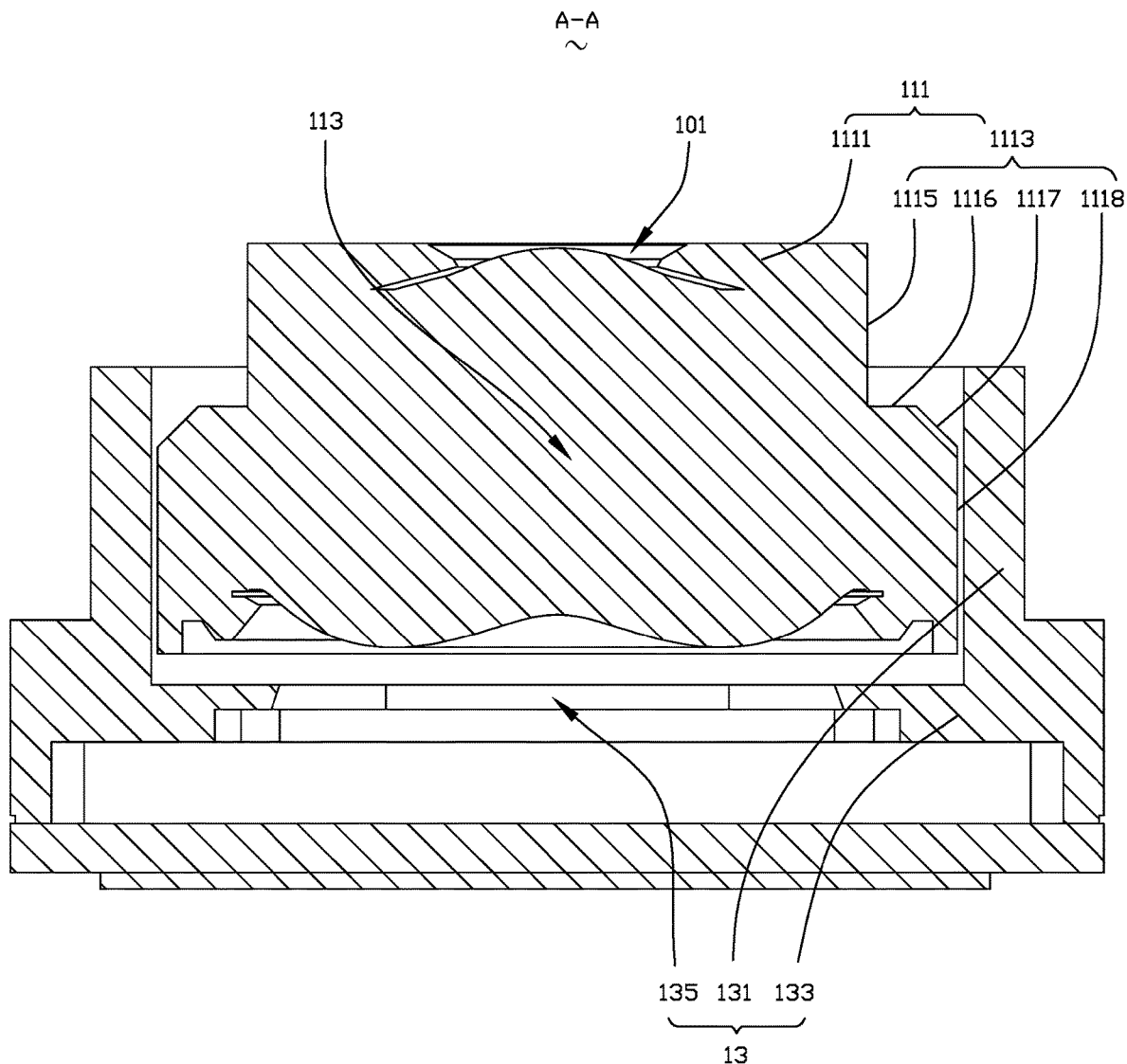
FIG. 2 is a sectional view of the lens module shown in FIG. 1 along a line A-A.

Referring to both FIG. 1 and FIG. 2, a lens module 100 includes a lens 11 and a bearing seat 13 matching connected to the lens 11. Specifically, the lens 11 is assembled on the bearing seat 13.

The lens 11 includes a lens barrel 111 and a lens group 113 disposed in the lens barrel 111. The lens barrel 111 includes a first barrel wall 1111 provided with an optical aperture 101 and a second barrel wall 1113 bending and extending from the first barrel wall 1111. The first barrel wall 1111 and the second barrel wall 1113 fit and are matched to accommodate the lens group 113.

The second barrel wall 1113 includes an outer surface 1115 connected to the first barrel wall 1111, a first outer side surface 1116 bending and extending from the outer surface 1115 in a direction away from an optical axis, a second outer side surface 1117 inclining and extending from the first outer side surface 1116 in the direction away from the optical axis, and a third outer side surface 1118 extending from the second outer side surface 1117 in a direction away from the first barrel wall 1111.

The bearing seat 13 includes a surrounding wall 131 around the second barrel wall 1113, a base 133 fixedly connected to the surrounding wall 131, and a through hole 135 opened in the base 133.

The surrounding wall 131 and the second barrel wall 1113 have matching shapes. In an embodiment, the surrounding wall 131 is annular, and the surrounding wall 131 and the lens 11 form an adhesive accommodating slot. The surrounding wall 131 and the lens 11 are bonded via the adhesive accommodating slot.

Specifically, the surrounding wall 131 and the third outer side surface 1118 are disposed right opposite each other, and the adhesive accommodating slot is enclosed by the surrounding wall 131 and the second outer side surface 1117 together.

A sectional area of the through hole 135 is less than a sectional area of a pattern enclosed by the surrounding wall 131, and a central axis of the through hole 135, a central axis of the surrounding wall 131, and the optical axis of the lens 11 are located on the same straight line. When the lens 11 is assembled on the bearing seat 13, a circumferential edge of an image-side surface of the lens 11 abuts the base 133.

In an embodiment, a cross section of the through hole 135 is rectangular. Preferably, four corners of the through hole are rounded corners.

Embodiment 2

Figure 3:
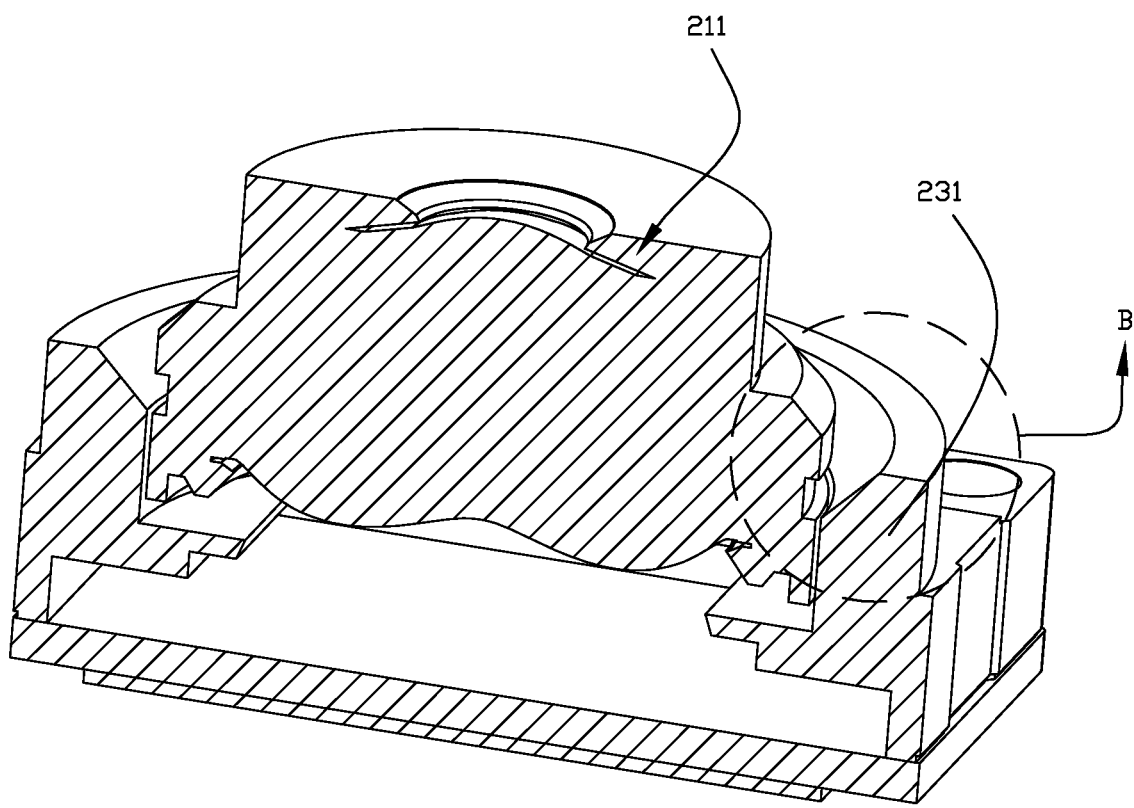
FIG. 3 is a sectional view of Embodiment 2 of a lens module according to the present disclosure.
Figure 4:
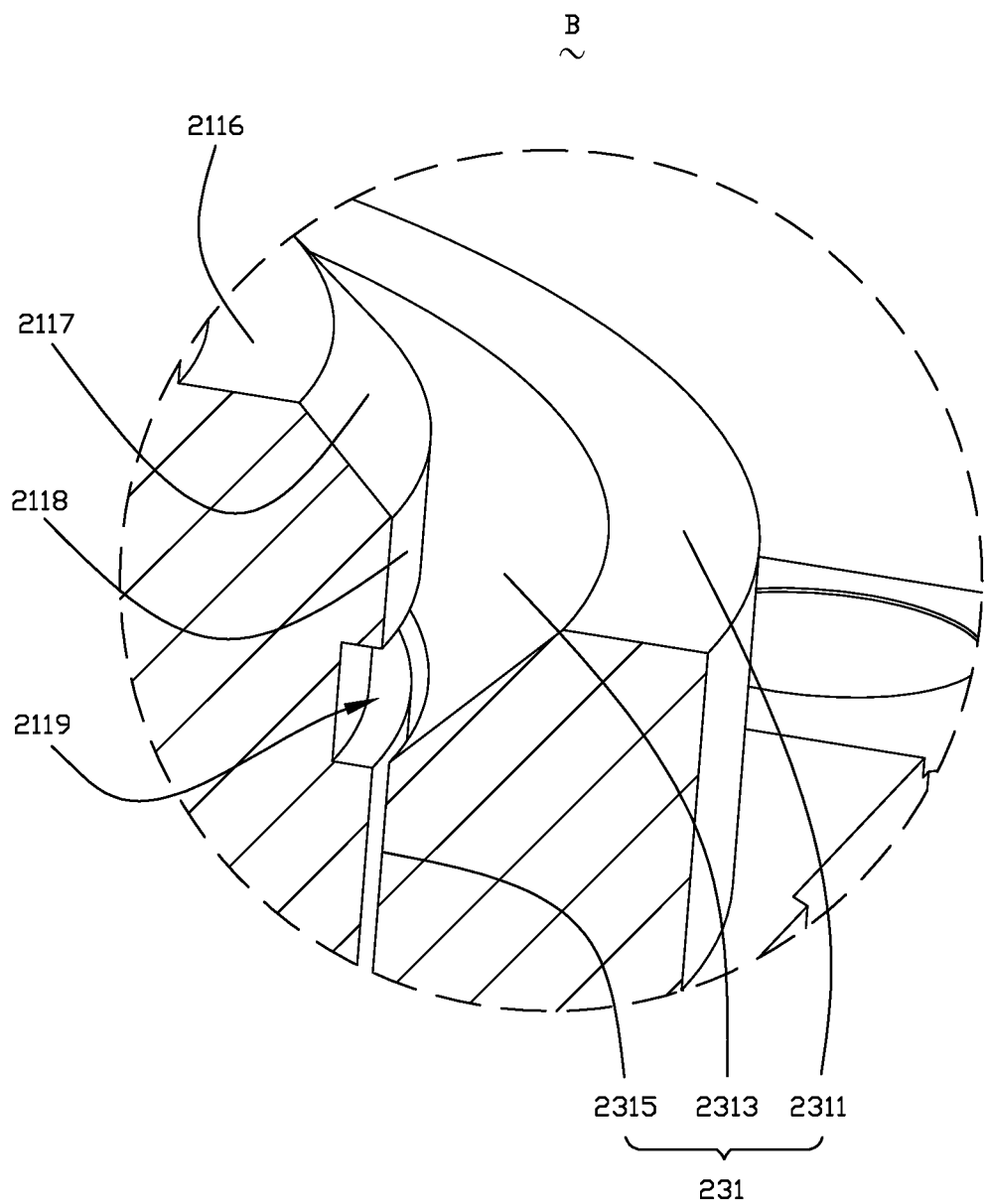
FIG. 4 is an enlarged view of the B part of the lens module shown in FIG. 3.

Referring to both FIG. 3 and FIG. 4, the structure of a lens module provided in an embodiment is basically the same as that of the lens module provided in Embodiment 1. A difference lies in that the structures of a lens barrel 211 and a surrounding wall 231.

In an embodiment, the second barrel wall includes an outer surface connected to the first barrel wall, a first outer side surface 2116 bending and extending from the outer surface in a direction away from an optical axis, a second outer side surface 2117 inclining and extending from the first outer side surface 2116 in the direction away from the optical axis, and a third outer side surface 2118 extending from the second outer side surface 2117 in a direction away from the first barrel wall, the third outer side surface 2118 and the surrounding wall 231 are disposed right opposite each other, and the lens barrel 211 is recessed from the third outer side surface 2118 in a direction towards the optical axis to form an adhesive dispensing slot 2119.

Specifically, the adhesive dispensing slot 2119 is provided in a circumferential direction of the second barrel wall, and the adhesive dispensing slot 2119 and the surrounding wall 231 form the adhesive accommodating slot.

Preferably, the adhesive dispensing slot 2119 has a continuous annular structure.

Correspondingly, the surrounding wall 231 includes a first surface 2311 far away from the base, a second surface 2313 inclining and extending from the first surface 2311 in a direction towards the lens barrel 211, and a third surface 2315 extending from the second surface 2313 towards the base. The third surface 2315 and the third outer side surface 2118 are disposed opposite each other at an interval. Specifically, a projection of the third surface 2315 onto the optical axis and a projection of the adhesive dispensing slot 2119 onto the optical axis do not overlap.

Specifically, the second surface 2313 and the adhesive dispensing slot 2119 together enclose the adhesive accommodating slot. By disposing the adhesive accommodating, and dispensing an adhesive in the adhesive accommodating slot to realize a fixedly connect of the lens barrel 211 and the surrounding wall 231, thereby increasing an amount of a dispensed adhesive and increasing the strength of bonding.

Compared with related technologies, a threadless design is used for the lens module provided in the present disclosure. To be specific, the adhesive accommodating slot is disposed between the lens and the surrounding wall, and an adhesive is dispensed in the adhesive accommodating slot to fixedly connect the lens and the surrounding wall, so that the lens module has a simpler structure, and a screen-to-body ratio of an electronic product is increased. Bonding is used in place of a threaded connection in related technologies, thereby reducing the processing difficulty of the lens module and improving production efficiency.

The foregoing describes only the implementations of the present disclosure. It should be noted herein that a person of ordinary skill in the art may further make improvements without departing from the creative concept of the present disclosure, but all these improvements fall within the protection scope of the present disclosure.

What is claimed is:

1. A lens module, comprising a lens and a bearing seat matching connected to the lens, the lens comprising a lens barrel, and the lens barrel comprising a first barrel provided with an optical aperture and a second barrel wall bending and extending from the first barrel wall, wherein the bearing seat comprises a surrounding wall around the second barrel wall, the lens is assembled on the bearing seat, the lens and the surrounding wall form an adhesive accommodating slot, the second barrel wall and the surrounding wall are bonded via the adhesive accommodating slot, the second barrel wall comprises an outer surface connected to the first barrel wall, a first outer side surface bending and extending from the outer surface in a direction away from an optical axis, a second outer side surface inclining and extending from the first outer side surface in the direction away from the optical axis, and a third outer side surface extending from the second outer side surface in a direction away from the first barrel wall; and the third outer side surface and the surrounding wall are disposed right opposite each other, the lens barrel is recessed from the third outer side surface in a direction towards the optical axis to form an adhesive dispensing slot, the adhesive dispensing slot is provided in a circumferential direction of the second barrel wall, and the adhesive dispensing slot and the surrounding wall form the adhesive accommodating slot.

2. The lens module according to claim 1, wherein the second barrel wall comprises an outer surface connected to the first barrel wall, a first outer side surface bending and extending from the outer surface in a direction away from an optical axis, a second outer side surface inclining and extending from the first outer side surface in the direction away from the optical axis, and a third outer side surface extending from the second outer side surface in a direction away from the first barrel wall; and the third outer side surface and the surrounding wall are disposed right opposite each other, and the second outer side surface and the surrounding wall form the adhesive accommodating slot.

3. The lens module according to claim 1, wherein the adhesive dispensing slot has a continuous annular structure.

4. The lens module according to claim 1, wherein the bearing seat further comprises a base fixedly connected to the surrounding wall and a through hole opened in the base, the surrounding wall comprises—a first surface far away from the base,—a second surface inclining and extending from the first surface in a direction towards the lens barrel, and—a third surface extending from the second surface towards the base, and the adhesive dispensing slot and the second surface form the adhesive accommodating slot.

5. The lens module according to claim 4, wherein the third surface and the third outer side surface are disposed opposite each other at an interval.

6. The lens module according to claim 4, wherein a projection of the third surface onto the optical axis and a projection of the adhesive dispensing slot onto the optical axis do not overlap.

7. The lens module according to claim 4, wherein the surrounding wall is annular, and a cross section of the through hole is rectangular.

* * * * *